Dec. 5, 1939.    L. S. LONGENECKER    2,182,497
APPARATUS FOR INTRODUCING FUEL INTO AN OPEN HEARTH FURNACE
Filed Sept. 23, 1937    3 Sheets-Sheet 1
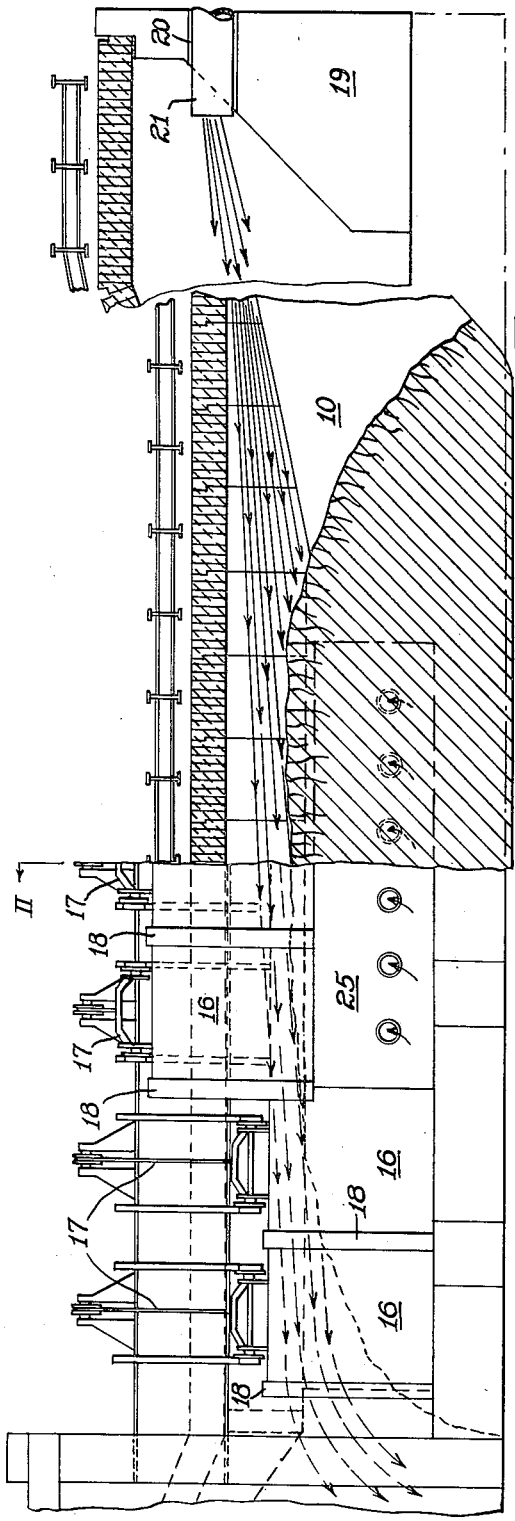
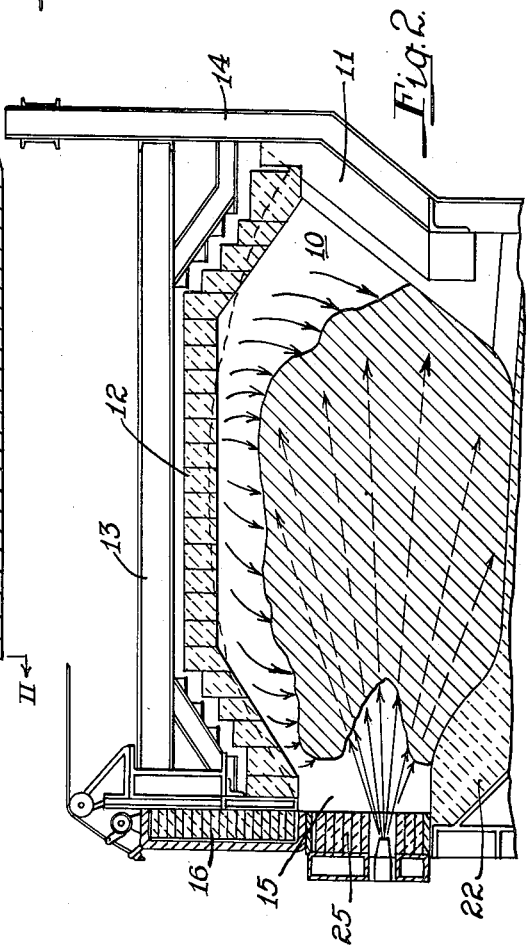
INVENTOR.
Levi S. Longenecker
BY Green & McCallister
His ATTORNEYS.

Dec. 5, 1939.　　　L. S. LONGENECKER　　　2,182,497
APPARATUS FOR INTRODUCING FUEL INTO AN OPEN HEARTH FURNACE
Filed Sept. 23, 1937　　　3 Sheets-Sheet 2
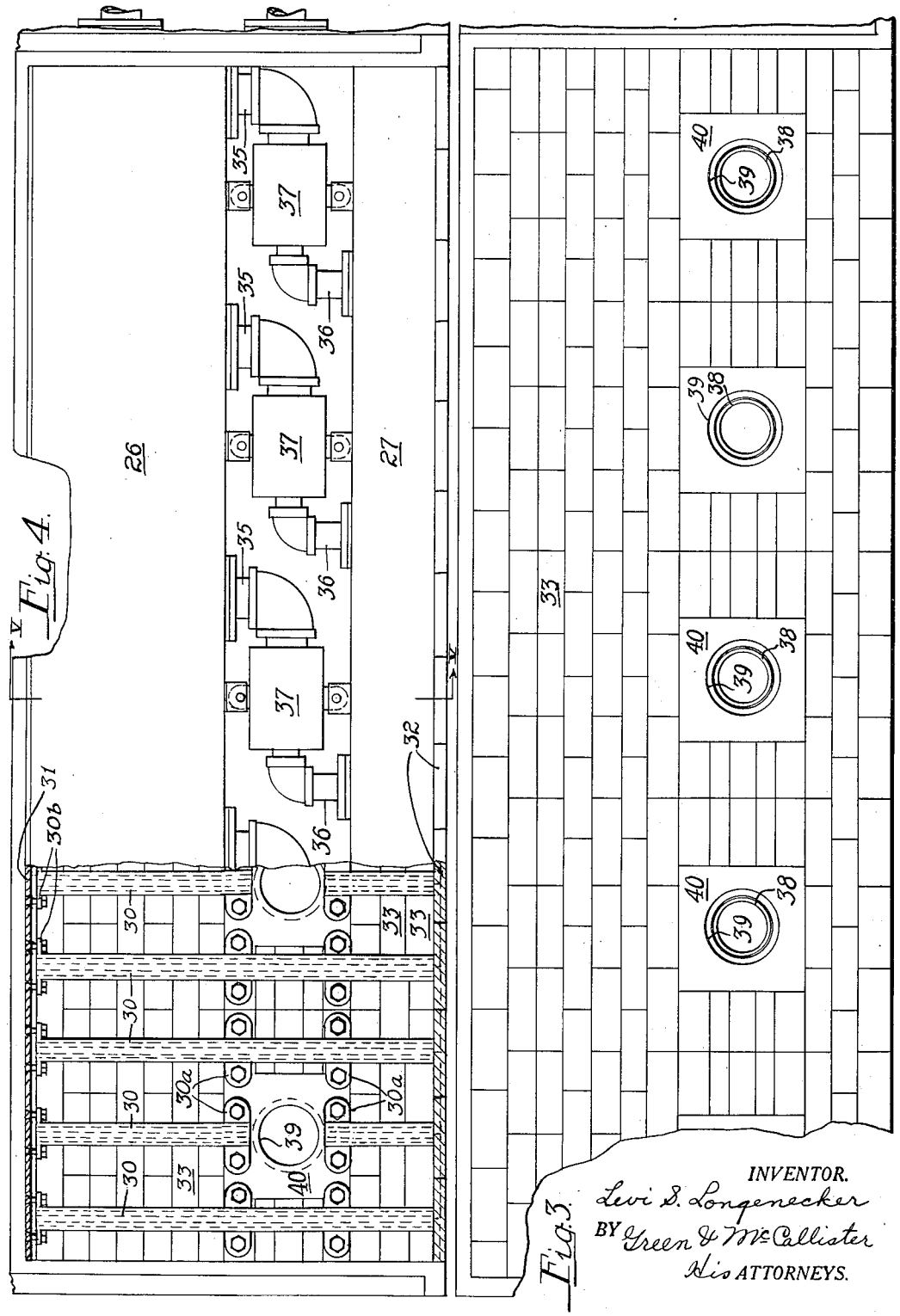
INVENTOR.
Levi S. Longenecker
BY Green & McCallister
His ATTORNEYS.

Dec. 5, 1939. L. S. LONGENECKER 2,182,497
APPARATUS FOR INTRODUCING FUEL INTO AN OPEN HEARTH FURNACE
Filed Sept. 23, 1937 3 Sheets-Sheet 3
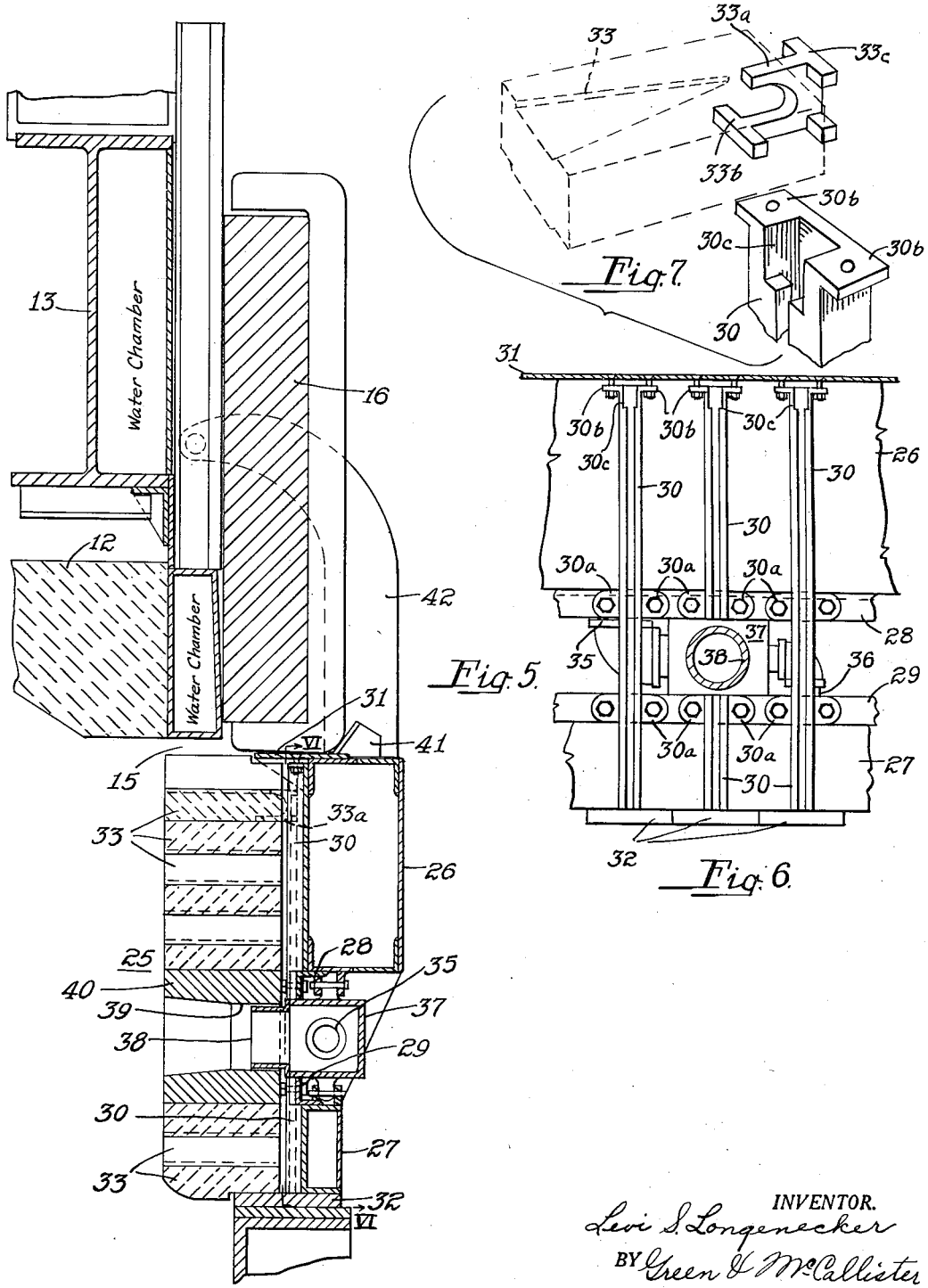
INVENTOR.
Levi S. Longenecker
BY Green & McCallister
His ATTORNEYS.

Patented Dec. 5, 1939

2,182,497

UNITED STATES PATENT OFFICE 2,182,497

APPARATUS FOR INTRODUCING FUEL INTO AN OPEN HEARTH FURNACE

Levi S. Longenecker, Pittsburgh, Pa.

Application September 23, 1937, Serial No. 165,254

8 Claims. (Cl. 263—43)

This invention relates to metallurgical furnaces of the open hearth type, and more particularly to apparatus for introducing fuel into such furnaces.

In the making of steel in a metallurgical furnace of the open hearth type, there are two distinct phases or stages of operation. The first is the melting down stage in which the charge, such as steel scrap or iron or steel in other forms, is reduced from a solid state to a molten state, and the second stage in which the molten steel is refined. The furnace should be operated differently during the melting down stage than it is during the refining stage, because, for efficient operation, a short, intense flame of the non-luminous or blow torch type, which will liberate the maximum amount of heat possible in a short distance of travel, is desirable to rapidly melt the charge, while in the refining stage a relatively long soft flame of the luminous type, which travels substantially the full length of the furnace and acts upon the delayed combustion principle in which the heat is liberated slowly, is desired to remove the impurities from the molten steel.

However, at the present time, to the best of my knowledge, all metallurgical furnaces of the open hearth type are fired during both the melting down stage and the refining stage, from conventional end ports which necessitates a long flame travel and the same burner arrangements—which project through the end ports— are used in each stage to direct the flame lengthwise of the furnace adjacent the roof or top arch thereof.

The primary object of this invention is to materially reduce the time required for the melting down of the charge and thus to increase the steel output of the furnace, and I accomplish this object by using a portable burner unit, as an auxiliary to the conventional end burners; and which is adapted to be installed in the charging opening in the side of the furnace and which has one or more burners therein for directing a flame or series of flames of the blow torch type directly against the charge in the furnace and underneath the flames from the end port burners to secure the equivalent of underfiring.

Another object of the present invention is to provide apparatus for firing an open hearth furnace which will not only decrease the time required to melt the charge in the furnace and, consequently, increase the furnace tonnage, but will also reduce the fuel and maintenance costs of such furnace.

A further object is to provide a burner unit for use on open hearth furnaces which is economical to manufacture, easy to install on the furnace and can be tilted in any desired direction to direct the flames issuing from the burners of said unit against the charge at any desired angle, and which can be readily and easily removed from the furnace during the refining stage—thus eliminating severe wear on the unit—and since it is portable it can be readily used on other furnaces during the melting down stage of such other furnaces.

These and other objects which will hereinafter be made apparent to those skilled in this particular art are accomplished by means of this invention, one embodiment of which is described in the following specification and illustrated in the accompanying drawings, wherein:

Figure 1 is a view partially in side elevation and partially in section, of a metallurgical furnace equipped with a portable burner unit made in accordance with my invention;

Fig. 2 is a sectional view taken on line II—II of Fig. 1;

Fig. 3 is a view in elevation of the furnace side of my portable burner unit.

Fig. 4 is an elevation of the outer side of the portable unit showing the fuel and air lines and the manifold arrangement of the burners and having a portion thereof broken away to show the refractory supporting members;

Fig. 5 is an enlarged sectional view showing the relation of my portable burner unit to the door of a furnace and is taken on the line V—V of Fig. 4;

Fig. 6 is a section taken on the line VI—VI of Fig. 5 and illustrates the frame of the portable burner unit and the refractory supporting members; and Fig. 7 is an exploded view in perspective of a refractory hanger and hanger supporting member of the portable burner unit.

In the drawings, 10 represents a metallurgical furnace of the open hearth type having a refractory back wall 11 and an arch or roof 12, which is suspended from a suitable metallic framework 13 carried by uprights 14. The back wall 11 is also carried by the uprights 14. The front wall of the furnace 10 is provided with a continuous and unobstructed charging opening 15 which extends substantially throughout the full length of the furnace. Charging opening 15 is normally closed by a series of refractory-lined doors 16 which are capable of being raised to open the charging opening and each door 16 is provided with a raising and lowering mechanism 17 of any desired construction. When the doors 16 are closed, the joints therebetween are sealed by members 18 which are adapted to be raised and lowered with the doors, and are so arranged that when two or more adjacent doors are opened, a continuous unobstructed opening into the furnace is provided, which is of a length substantially equal to the width of all the doors raised. The doors 16 and the seals 18 are preferably of the type illustrated in my United States Patent No. 2,045,662, dated June 30, 1936.

The ends of the furnace 10 are closed by end walls 19 having ports 20 therein for receiving burners 21 through which fuel is introduced into the furnace. The burners 21 are so positioned that the flames travel lengthwise of the furnace underneath the roof or arch 12, as is typical in present furnace construction. While only one end wall 19 is shown, it is understood that the other end wall is similar thereto and is likewise provided with a burner port.

The present invention relates particularly to a portable burner unit 25 which is adapted to be placed in the charging opening 15 for directing a flame of the blow torch type directly against a charge which has been previously introduced through the charging opening 15 and which rests on the furnace hearth 22. While the portable burner unit 25 may be of any desired length, I prefer to make it of a length substantially equal to the width of one or a multiple of doors, so that when the unit is positioned in the furnace, the ends of the unit will abut against the edges of the doors adjacent thereto without leaving any substantial opening or space therebetween.

Portable burner unit 25 comprises, in general, an outer metallic frame which supports a series of refractory blocks forming the inner or furnace side of the unit. The frame is of built up construction and includes an air duct 26, a fuel duct 27—both of which extend lengthwise of the unit adjacent the top and bottom thereof, respectively—angle irons 28 and 29 attached to the bottom of the air duct and top of the fuel duct, respectively, and a series of vertically extending and horizontally spaced castings 30 having ears 30a which are bolted to the angle irons. The top of the air duct 26, which is built up of angles and plates welded together, is welded to a plate 31 which, in turn is bolted to lugs 30b on the sides of the castings 30, and the bottom of the fuel duct 27, which as shown is of built up construction and is supported on the feet 32 of the castings 30. Castings 30 are preferably of substantially closed channel shape in section and have their inner faces adjacent the top thereof cut away, as at 30c, to provide access to the interior of the castings, whereby refractories 33 may be suspended from the castings 30 by means of hangers 33a which have a refractory engaging portion 33b and a head 33c adapted to slide in the casting 30. Refractories 33 are preferably of the interlocking type and the bottom tier thereof is supported directly on the feet 32 of the castings 30.

Pipes 35 and 36 are respectively connected to the air duct 26 and the fuel duct 27, at any desired intervals along the length thereof, for establishing communication between said ducts and a series of burners 37. The fuel and air delivered to each burner 37 are mixed together therein and directed into a burner collar 38—one for each burner—which extends into a port 39 in a refractory burner block 40.

In the use of my improved burner unit in the manufacture of steel in an open hearth furnace, a steel forming charge, such as scrap or other suitable material, is introduced into the furnace 10 through the charging opening 15—the doors 16 then being raised—and piled on the hearth 22 of the furnace. After the furnace has been charged, one or more doors 16 carrying with them the seals 18 and having a combined width equal to the length of the burner unit 25, are raised and the burner unit 25 is then placed in the charging opening 15 with the ends thereof abutting against the sides of the closed doors at each end thereof and the bottom supported on the si'l of the charging opening.

With the burner unit 25 in this position, the open doors 16 are lowered into engagement with the top of the burner unit to seal the same. Members 41 having beveled inner surfaces are provided on the top of the burner unit and are adapted to engage and cooperate with the bottoms of the doors 16 to guide the same to proper sealing position on the unit. The portable burner unit 25 is also provided at each end with an upwardly and inwardly projecting member 42, which members are adapted to engage the front of the furnace and aid in holding the unit in proper position within the charging opening 15.

After the portable burner unit 25 has been positioned in the charging opening 15 and the doors 16 lowered to seat on the top thereof, the air duct 26 and the fuel duct 27 are connected to suitable sources of air and fuel, respectively, whereby fuel and air are delivered through pipes 35—36 to the manifolds 37 and directed into the burners 38. Since the fuel and air are premixed, a b'ow torch-like flame issues from each burner. These burners are so spaced that a ribbon-like flame is provided and directed on the face of the charge exposed to the charging opening 15. At the same time, flames from the end port burners 21 are directed lengthwise of the furnace to heat the top of the charge and the roof or arch of the furnace. If desired, air and fuel ducts 26 and 27 of the portable unit 25 may be connected to the same source of supply as the end port burners 21 whereby a portion of the fuel delivered to the end ports will be diverted to the burners 38, or, the ducts 26—27 may be connected to auxiliary sources of supply whereby additional fuel will be introduced into the furnace through the burners 38.

By using my portable burner unit in connection with a furnace during the melt-down stage, a series of short intense flames of the blow torch type are directed from the side of the furnace directly into contact with the charge on the furnace hearth. These cut tunnels into the charge and provide a condition equivalent to underfiring the charge.

As the charging opening 15 is below the end port burners 21, it is apparent that the high velocity flames entering the furnace through the burners 38 will be below the flames issuing from the end port burners 21 and will travel at substantially right angles to the end port flames. Consequently, the flame from the end port burners not only acts as a shield and prevents the high velocity blow torch-like flames from burners 38 from impinging against the furnace arch but aids in confining such flames to the charge.

After the melt-down has been completed, the portable unit 25 is removed from the furnace, the doors 16 are closed and the refining procedure is carried on in the usual manner; the flames for the refining period being restricted entirely to the end burners 21.

It will be apparent from the foregoing description that by using my improved portable burner unit, the speed of melting down a charge in the furnace is not only materially increased but a shorter length of time is required for the melt-down and, consequently, the steel output of the furnace is materially increased.

It will also be apparent, since the portable unit is used only during the melting down period and is removed from the furnace during the refining stage that one set of portable units may be used to take care of several furnaces. Since the burners are removed when not in use, wear and tear on the burners and the wall exposed to the hot inside temperature of the furnace is eliminated.

While I have illustrated the air duct 26, fuel duct 27, the angles 28—29 and members 30 as forming the structural steel framework on which the refractory tiles, castings and burners are supported, it is to be understood that any type of framework may be employed for supporting the refractories and that the ducts for introducing the gas and air to the burner may be attached to the framework in any desired manner without departing from my invention. Further, it should be noted that when the portable unit has been positioned in the charging opening 15, it may be tilted forward or backward to vary its vertical position by merely placing wedges between the bottom of the unit and the sill of the charging opening, to direct the ribbon-like flames issuing from the burners 38 against the charge in any desired direction.

It should be understood that while I have illustrated my invention in connection with an open hearth furnace having a continuous and unobstructed charging opening in the front wall thereof, my portable burner unit may also be used to advantage with the conventional type of open hearth furnace in which the front wall thereof is provided with a plurality of door openings, separated by door jambs. In the conventional type of furnace individual doors are employed for closing the openings defined by the door jambs in the front wall thereof. When my portable burner unit is to be used with such conventional type of furnace, the unit is made of a width substantially equal to the width of the door opening and one unit is installed in each door opening or in as many of the door openings as may be desired.

The method disclosed in this application is claimed in my application Serial No. 260,717, filed March 9, 1939.

Having thus described my invention, what I claim as new and desire to secure by Letters Patent is:

1. The combination with a furnace having a hearth, end firing ports and displaceable doors, of means for causing a melting flame to enter said furnace through said end ports and means adapted, when said doors are displaced, to cause a melting flame to enter said furnace through the space provided by such door displacement.

2. The combination with an open hearth furnace provided with end firing ports and a plurality of doors in one side thereof which are capable of being independently raised, of means for raising a predetermined number of such doors to form an opening in the furnace side, a portable auxiliary burner unit adapted to be disposed in the space so provided, and means for causing charge melting flames from said auxiliary burner unit to enter said furnace.

3. The combination with a metallurgical furnace of the open hearth type provided with end firing ports and a plurality of independently raisable doors in one side thereof, of a portable auxiliary burner unit adapted to be disposed in the space provided when said doors are raised, and being made up of a refractory body provided on the furnace side thereof with suitable burners and on the room side thereof with fuel and air supply connections.

4. The combination with a metallurgical furnace of the open hearth type having end firing ports and a plurality of independently raisable doors in one side thereof, of a portable auxiliary burner unit adapted to be disposed in the space provided by the raising of one or more of said doors and having fuel and air ducts forming the framework therefor, a refractory body supported on said framework, and burners connected to said ducts and being so constructed as to provide a flame of the blow torch type.

5. The combination with a metallurgical furnace of the open hearth type provided with end firing ports and a plurality of independently raisable doors in one side thereof, of a portable auxiliary burner unit adapted to be disposed in the space provided when said doors are raised, and including a refractory body provided on its furnace side with burners and on its room side with fuel and air supply connections, and being angularly adjustable about its vertical axis to vary the angle at which the flame issuing therefrom will impinge upon a charge resting upon the furnace hearth.

6. The combination with an open hearth furnace provided with end firing ports and a plurality of independently displaceable doors in one side thereof and means for raising each of said doors independently, of a portable unit adapted to be disposed in the space provided by the raising of one of said doors and including an auxiliary burner unit for directing a short intense flame of the blow torch type into said furnace.

7. The combination with an open hearth furnace having end firing ports and a series of independently displaceable doors in one side thereof, of a refractory lined unit adapted to be disposed in the opening provided by displacing one or more of said doors and which includes a burner, and means for introducing a combustible mixture into said burner.

8. In an open hearth furnace having side charging openings provided with displaceable doors, means for introducing through certain of said openings when said doors are raised, intense flame of high velocity for melting down the furnace charge, end ports and means for introducing through said end ports luminous flame of low velocity for blanketing the furnace roof to protect the same against the effect of said intense high velocity flame and for refining the melted down charge after closing said doors.

LEVI S. LONGENECKER.